(12) United States Patent
Newcomb

(10) Patent No.: US 8,504,968 B2
(45) Date of Patent: Aug. 6, 2013

(54) METHOD TO DETERMINE HIGH LEVEL POWER DISTRIBUTION AND INTERFACE PROBLEMS IN COMPLEX INTEGRATED CIRCUITS

(76) Inventor: Jesse Conrad Newcomb, Daly City, CA (US)

( * ) Notice: Subject to any disclaimer, the term of this patent is extended or adjusted under 35 U.S.C. 154(b) by 0 days.

(21) Appl. No.: 13/451,530

(22) Filed: Apr. 19, 2012

(65) Prior Publication Data

US 2012/0266121 A1    Oct. 18, 2012

Related U.S. Application Data

(63) Continuation-in-part of application No. 13/401,704, filed on Feb. 21, 2012.

(60) Provisional application No. 61/476,320, filed on Apr. 17, 2011, provisional application No. 61/543,395, filed on Oct. 5, 2011.

(51) Int. Cl.
*G06F 17/50* (2006.01)

(52) U.S. Cl.
USPC ............ 716/120; 716/106; 716/109; 716/133

(58) Field of Classification Search
USPC .................. 716/106, 109, 120, 133
See application file for complete search history.

(56) References Cited

U.S. PATENT DOCUMENTS

| | | | | |
|---|---|---|---|---|
| 5,537,328 A * | 7/1996 | Ito | ................................. | 716/120 |
| 6,191,647 B1 * | 2/2001 | Tanaka et al. | .................. | 327/551 |
| 6,770,963 B1 * | 8/2004 | Wu | ................................ | 257/691 |
| 7,129,574 B2 * | 10/2006 | Wu | ................................ | 257/691 |
| 7,142,991 B2 * | 11/2006 | Hathaway et al. | .............. | 702/57 |
| 7,750,460 B2 * | 7/2010 | Fishley et al. | ................. | 257/691 |
| 7,917,877 B2 * | 3/2011 | Singh et al. | .................... | 716/118 |
| 8,225,251 B2 * | 7/2012 | Newcomb | ..................... | 716/106 |
| 2012/0151427 A1 * | 6/2012 | Newcomb | ..................... | 716/109 |
| 2012/0266121 A1 * | 10/2012 | Newcomb | ..................... | 716/109 |
| 2012/0266122 A1 * | 10/2012 | Newcomb et al. | ............ | 716/109 |

* cited by examiner

*Primary Examiner* — Sun Lin
(74) *Attorney, Agent, or Firm* — Stephen E. Zweig

(57) ABSTRACT

A computer software implemented method of automatically determining adequacy of an integrated circuit electrical power distribution and signal protection schemes, based on netlist data, which does not rely on other a-priori data. The method determines which nets are power supply nets, their connectivity to different types of power supplies. The method automatically traverses the nested block structure of the circuit, ascending and descending in block hierarchy as needed, and automatically determines (often based on an inspection of the power needs of the individual block devices) the type of power supply needed to power that block, power supply adequacy, and adequate protection of signal interfaces to other blocks. The method can present the analysis in a high level report, such as a graphical map, that can make root cause sources of power and power related signal interface problems immediately evident, and which suppresses most irrelevant details.

21 Claims, 7 Drawing Sheets

METHOD TO DETERMINE HIGH LEVEL POWER DISTRIBUTION AND INTERFACE PROBLEMS IN COMPLEX INTEGRATED CIRCUITS

CROSS REFERENCE TO RELATED APPLICATIONS

This invention is a continuation in part of U.S. patent application Ser. No. 13/401,704, "AUTOMATED IDENTIFICATION OF POWER AND GROUND NETS IN AN INTEGRATED CIRCUIT NETLIST", inventor Jesse Conrad Newcomb, filed Feb. 21, 2012; Ser. No. 13/401,704 in turn claimed the priority benefit of US provisional application 61/476,320, "Analysis of Electronic Circuits", Inventor Jesse Conrad Newcomb, filed Apr. 17, 2011; this application also claims the priority benefit of US provisional application 61/543,395, "Analyzer of Electronic Circuits", Inventor Jesse Conrad Newcomb, filed Oct. 5, 2011.

BACKGROUND OF THE INVENTION

1. Field of the Invention

This invention is in the field of software tools for integrated circuit design and analysis.

2. Description of the Related Art

Modern integrated circuit chips are extremely complex devices, which may have millions of different electronic components (devices), such as NFET and PFETs, switches, and the like. These circuits, which are usually designed by teams of engineers using various circuit description languages (e.g. Berkeley SPICE, CDL (Circuit Description Language), Spectre™ LVS (Layout vs. Schematic) and the like). The circuits will typically comprise millions of individual devices and nets, and will often be powered by multiple power supplies (e.g. higher voltage, lower voltage, noisy, quiet, low current, higher current), as well. The chips are often so complicated that they far exceed the ability of the human designer's minds to fully understand, absent various computer assisted analytical tools.

Typically, integrated circuits are usually designed by using software tools to combine computer representations of various smaller blocks of circuits into computer representations of larger blocks of circuits, and then using other computer tools to connect the blocks through various Input/output (TO) interfaces and power connections. Each block has its own netlist and various devices, and these various smaller building blocks can be grouped into larger and larger circuit blocks, in a manner somewhat reminiscent of using image editors or CAD programs to construct final graphic images by combining various layers of sub-images.

Each block will generally have its own function, internal netlist, and power supply needs. As the various smaller or child blocks or sub-blocks are assembled into larger and larger parental blocks, the larger blocks can be viewed as created from a plurality of sub-blocks that are nested within the larger block. This block and nested sub-block type layered structure can often go on for many layers or nesting levels, until a final lowest "leaf" level is reached.

Thus the computer design tools used to design these chips typically store libraries of various standardized and debugged circuit blocks in memory. The various design engineers, during at least some phases of the circuit design process, select various blocks from design libraries. They then use their various computer design tools connect the various signal and power interfaces between these various blocks to form more complex designs.

For example, a large integrated circuit chip with perhaps 10 million devices or nets may have been built from 2000 circuit cells or larger assemblies of circuit blocks, many of which will be taken from the design library. As a result of this typical "pick circuit blocks from the library and place on the chip" type design process, the overall circuit netlist is organized as a series of blocks in a layered, branched, or nested hierarchy pattern. Some branches of this nested block hierarchy may be quite deep, while other branches may be quite shallow.

Thus at a high level, the overall circuit structure or netlist can be viewed as a being composed of major circuit domains, each with its own type of power supply. The various circuit domains in turn are composed of a hierarchy of nested blocks, with various signal and power interfaces between these various blocks.

Given the overall complexity of typical modern integrated circuits, it is inevitable that there will be many different types of design errors. Thus a large part of circuit design is focused on detecting and correcting these design errors.

Because different circuit blocks can have different power supply requirements, one common type of design error is an error where the power distribution scheme within a larger integrated circuit is inadequate to support the various power needs of the various circuit blocks and sub-blocks. Often this power distribution inadequacy may not be apparent at the highest level bocks, but rather is a problem that occurs lower in the hierarchy of nested lower level blocks.

Another type of power related design error is one in which the electrical signal interfaces or signal lines (TO interfaces) between different blocks with different power supplies are inadequate to cope problems caused by these different power supplies. For example, some blocks may be supplied by lower voltage power supplies, and their interfaces to other blocks, which may be supplied by higher voltage power supplies, must be adequately protected to properly convey the signal and to prevent circuit damage. As another example, some blocks may be supplied by noisy power supplies that with greater power fluctuations, their signal interfaces to other blocks, that are less tolerant to noise, and thus are served with lower noise power supplies, must also be adequate.

Although various computer analytical software tools, exemplified by the Cadence Spectre tool and the Synopsis HSIM tool, are available to trace various power related design flaws, such tools generally are focused a very detailed level of circuit design. As a result, such prior art tools fail to "see the forest for the trees" in that rather than reporting the root cause analysis of problems (e.g. the "crime suspect"), instead they tend to report on the huge number of "victims" instead. This tends to bury any important information in a sea of irrelevant results, and makes proper corrective action difficult.

Thus further improvements in computer software tools to detect and report high level problems in circuit design caused by inadequate power distribution schemes, and inadequate protection of signal interfaces from power related issues, would be useful.

BRIEF SUMMARY OF THE INVENTION

The invention is based, in part, on the insight that although there exist software tools to detect and report various power related problems in integrated circuit chip, such prior art tools generally operate at the "micro" level. That is, they report on individual circuit power related problems, but fail to present the "macro" or big picture. By analogy, prior art methods are a bit like trying to understand the cause of an airplane crash by detecting and reporting on the identity and histories of all of the victims, rather than detecting and reporting that the left engine fell off after takeoff because it was not properly bolted on (i.e. finding the root cause).

The invention is also based, in part, on the insight that typically, when power related problems are being investigated, the problems are most often caused by mismatches between different blocks of circuits that are being served (or alternatively should be served) by different types of power supplies. This is due, in part, to the fact that often at least the lowest level "leaf" blocks in a circuit are typically taken from a library of standardized (i.e. previously debugged) blocks, and these library obtained blocks will usually work well if provided with the proper type of power and signals.

The invention is also based, in part, on the insight that, at least when power issues are being investigated, those circuit blocks and interfaces that do not have power related problems are often both irrelevant and distracting. Thus often details pertaining to blocks and interfaces that were not found to have power related problems should be minimized in order to focus attention on the problem areas.

The invention is also based, in part, on the insight that although the original high level circuit designer may have had a particular high level power management scheme in mind to manage the differing power needs of the various circuit domains, blocks, and interfaces, there may be hidden problems. For example, the original high level power management scheme may have overlooked certain power related issues, or may have handled certain power related issues incorrectly. Alternatively, certain design decisions may have been implemented by other members of the design team that may cause unforeseen power related problems. Even the design software itself may inadvertently cause problems. Thus, irrespective of the intent of the original high level power management scheme, for power debugging purposes, it is useful to reexamine these various issues from a fresh perspective.

The invention is also based, in part, on the insight that what is needed is an automated software tool that can independently analyze the power relationships in a complex integrated circuit chip, and generate high level reports, ideally understandable to the original high level circuit designer. These reports should ideally provide feedback on the circuit's high level power management problems in a manner that allows easy comparison to the circuit's original high level power management scheme. Ideally, for example, the report might allow a high level chip designer to look at the analysis, and realize that the original high level power management scheme simply used an inadequately rated power switch, or lacked a proper level shifter between two domains served by different power supplies.

The invention is also based in part, on the insight that to do this automated and independent power analysis, it is useful to extend the methods of parent application Ser. No. 13/401, 704, the contents of which are incorporated herein by reference; and where necessary determine the actual power needs of a particular circuit block by an automated process that examines the power needs of the block's devices, according to that block's particular netlist. Although building on some of the methods of Ser. No. 13/401,704, however, it is also useful to use additional methods as well, and these are described in more detail herein.

Thus in one embodiment, the invention may be a computer software implemented method of determining, from the netlist specification of a complex integrated circuit chip, an evaluation of the overall adequacy of the chip circuit's various electrical power distribution and power protection schemes. This method will generally comprise determining which nets are power supply nets, and determining the connectivity of these power supply nets to different types of power supplies.

The method will then automatically traverse the nested block structure of the circuit, ascending and descending in the nested block hierarchy as needed, and automatically determine (often based on an inspection of the power needs of the individual block devices) the type of power supply needed to power that block, if the block in fact has an adequate power supply, and if any of the block's IO interfaces to other blocks are problematic due to differing power supplies between blocks. The method will then often report the results in a manner that tends to hide detail in those domains and hierarchies of nested blocks where there is not an issue, but which exposes more detail when problems are detected. Often it will be useful to present the results in graphical form, showing the relations between the major domains and blocks, and highlighting particular problem areas.

DETAILED DESCRIPTION OF THE INVENTION

Figure 1:
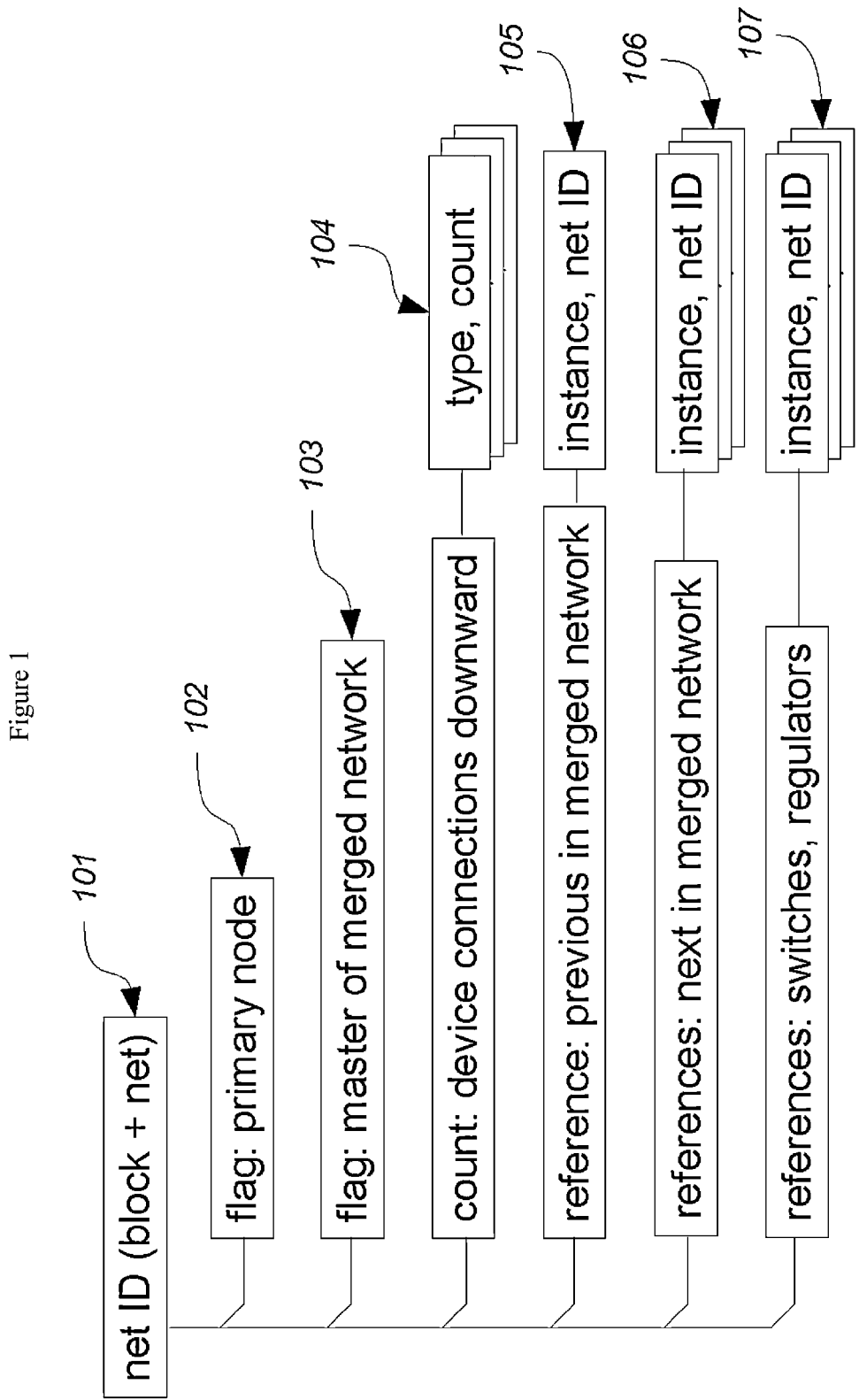
FIG. 1 shows an example of a software data structure for one net in a block, which the invention may use to perform the various power analysis methods described herein.

As previously discussed, integrated circuits are almost always designed with a master or high-level map, scheme or plan for to handle the circuit's power distribution and protection needs. At present, this high level map, scheme or plan is often created by one or more top level design engineers. Because these plans are intended to be high level concepts produced for the benefit of other skilled human circuit designers to then implement, such designs tend to be informal. They often exist in the form of a drawing or sketch, rather than as an actual top level map generated by a computerized circuit design program.

Once these and other various top level maps and specifications are given to other members of the design team, generally the formal part of chip design then commences using various prior art software methods and tools to translate the top level design intent into more specific design files that guide the circuit design.

Due to the complexity of the chips and design process, errors are inevitable, and much of the design process consists of using various software chip analysis tools to analyze and debug the prototype chip design netlist, which itself exists in the form of software files at this stage in the process. As previously discussed, various prior art software methods are used to debug these chip designs. These methods include the Insight EDA Analyzer software products. Typically these various analysis and debugging tools exist in the form of software programs, typically running on computer systems with at least one processor, memory, user interface (e.g. a GUI display screen and keyboard/mouse), as well as mass storage and network connectivity. The methods described herein are also software methods, and will also typically operate on such computer systems.

As previously discussed, prior art methods do not presently evaluate the appropriateness of the original chip specifications, such as the high level map, scheme or plan that describes how the differing power requirements of different chip power domains may be adequately handled. Rather, what typically happens at present is that if the high level power map has an error, even a simple error, the analysis software typically outputs a large number of consequences of this more fundamental or "root cause" design error, rather than tracing problems back to the root cause and displaying the root cause.

To generate such root cause information, the invention's methods operate by doing a detailed power analysis of the integrated circuit at multiple levels, ranging from large and high level circuit blocks, down through the various nested hierarchies of smaller circuit blocks that together form the larger circuit blocks, and on down to individual circuit devices. The invention's method then essentially reverse-engineers, based on the actual block devices and actual block circuit netlists, what sort of original high level scheme or plan would have or could have created the observed distribution of power related problems (i.e. the root cause of any observed power problems).

In one embodiment, the invention's methods can be used to produce a human readable, high level or summary level "intent diagram" or map showing what is actually going on. This high level or summary level intent diagram or map can then be used by the human circuit designers to review and inspect basic design errors that otherwise might be obscured by the vast and complex workings of the integrated circuit.

More specifically, the invention's methods can be used to create an overall map of the circuit's power domains, which can also highlight or show various power related problems in the context of these power domains. In addition to enabling a human design engineer to quickly see where a power related problem or cause of a power related problem may exist, the invention may also be used to review circuit designs. The invention may be further used to verify that the original design intent inputs or specification, at least with regards to power issues, has been actually followed in the software design and construction of the circuit.

At the heart, the invention relies on a number of analytical rules such as:

1: A circuit that has multiple types of power supplies should ideally have protection between the different power domains. Here a "power domain" is defined as one or more groups of circuit blocks, nested circuit blocks, and individual devices that are served by the same type of power supply. Those groups of circuit clocks, nested circuit blocks, and individual devices that are served by different types of power supplies are considered to be in different power domains. Thus different power domains can be circuit blocks or devices that require, or are served with different types of electrical power (e.g. higher voltage power, lower voltage power, noisy power (e.g. noise caused by digital switching circuits), quiet power (often needed for analog portions of a circuit)).

2: Those circuit blocks, nested circuit blocks, and devices within a particular power domain should ideally have adequate power delivery to the various circuits within that domain. Thus if, for example, a particular power switch serving a particular power domain has too low a current rating (i.e. is too small), that domain may be unpowered, and this should be flagged or otherwise reported as an error.

3: A power domain should not contain devices with an insufficient power rating (e.g. a low voltage device that might be damaged when placed in a high voltage domain). Additionally, an insufficiently rated device should not be placed in the interface between one power domain and another power domain.

4: Various methods may be used to analyze the power requirements of a particular circuit block, and to properly trace the power rails that connect a particular circuit block with a particular power supply or type of power supply One preferred method of doing this is to make use of the software implemented power analysis methods previously discussed in parent application Ser. No. 13/401,704, and incorporated herein by reference. Briefly, these methods work by determining the electrical properties of each device or device terminal that is coupled to the analyzed net, and creating an overall mathematical description of the overall electrical properties of these various devices. The method will then compare this mathematical description with various preset mathematical descriptions of power nets or a ground nets. If the overall mathematical description fits particular preset criteria, the invention will at least provisionally determine that this particular analyzed net is a power net or a ground net. The invention may also determine likely voltages for these various power nets by examining the voltages needed to adequately power their various components.

According to the methods of Ser. No. 13/401,704, for various circuit blocks, the invention may determine which nets may be power nets or ground nets by determining the electrical properties of each device or device terminal that is coupled to the block's analyzed net, and sorting the electrical properties for each device or device terminal into a series of bins, thereby creating a mathematical description of the overall electrical properties of the various devices that are coupled to the analyzed net. The methods of Ser. No. 13/401,704 will generally compare this mathematical description with at least one preset mathematical description of a power net or a ground net. If this overall description falls within at least one preset mathematical description of a power net or a ground net, then the method will at least provisionally determine that the analyzed net is a power net or a ground net, and storing this determination in memory for later use.

Further, according to the methods of Ser. No. 13/401,704, to determine the likely voltage needs of a particular circuit block, the invention may analyze the voltage requirements of each device or device terminal that is coupled to the provisionally determined power net, and determine a likely voltage or current that is consistent with the voltage or current requirements of each device or device terminal that is coupled to this provisionally determined power net.

Again using the methods of Ser. No. 13/401,704 as a particular example, to determine the power requirements of a particular circuit block, the invention may further determine the total number of devices connected to the provisionally determined power net, and the likely power consumption of each device, and determine the likely current consumption of the provisionally determined power net based on the number of devices and the power consumption of each device.

In the following examples, the basic methods of Ser. No. 13/401,704 have been further extended to enable a still higher level of analysis. In this type of analysis, the invention's software implemented methods will generally accept as input, a computer readable netlist of a particular integrated circuit chip, and then proceed to analyze the netlist as follows.

1: For at least those circuit nets to be analyzed, the invention's methods will create a data structure, normally residing in computer memory, which holds information pertaining to that particular circuit net. This data structure is designed to facilitate the implementation of some of the device counting and analysis aspects of Ser. No. 13/401,704, as well as to facilitate implementation of other methods that require that a particular circuit block's connection to other circuit blocks be understood and tracked in terms of the block's context in the overall circuit design.

Figure 6:
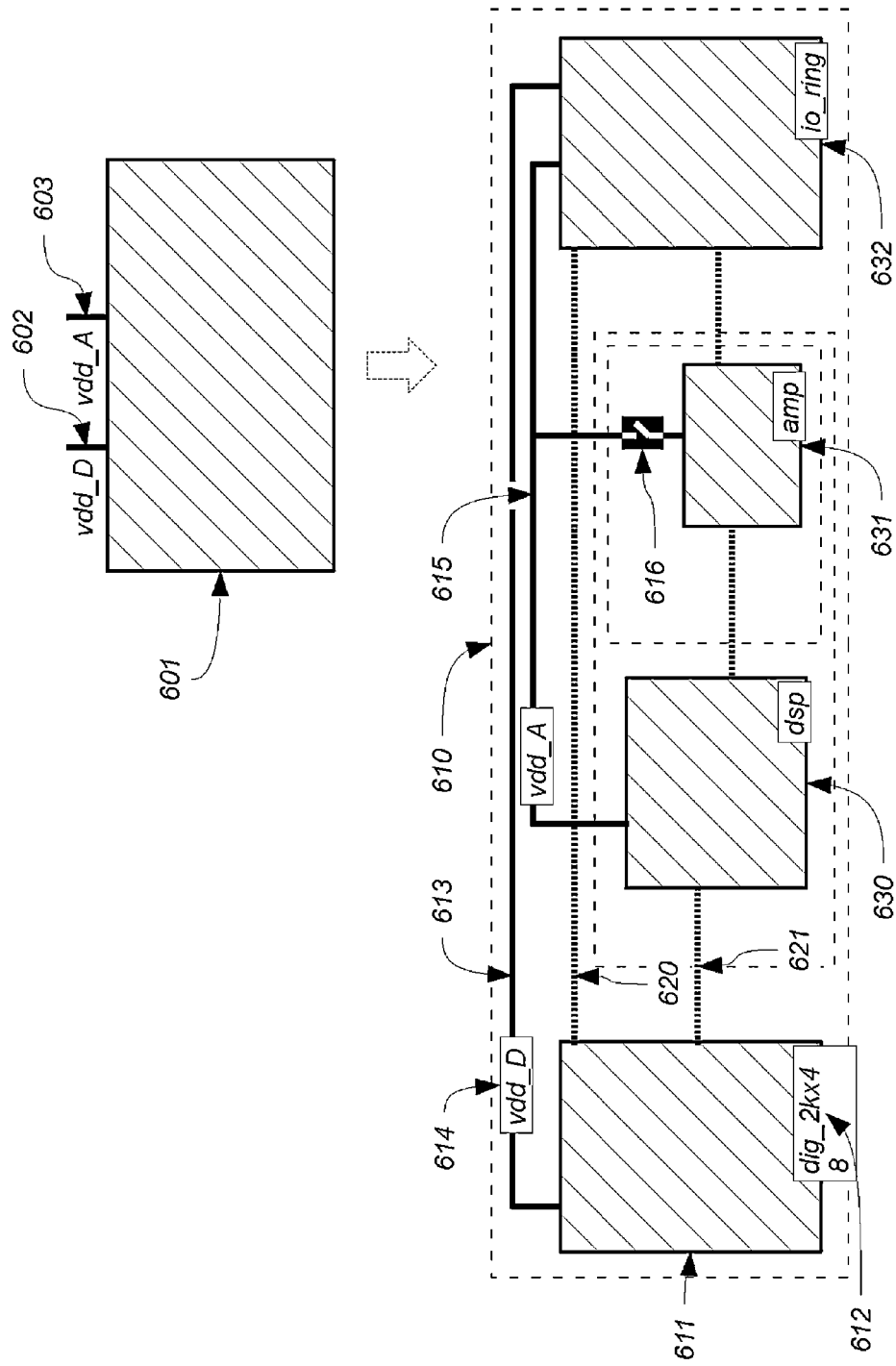
FIG. 6 shows an example of how the invention's methods can provide a high level diagram, showing the major relationships between the various chip power domains, along with root cause problem analysis of various power supply issues.
Figure 7:
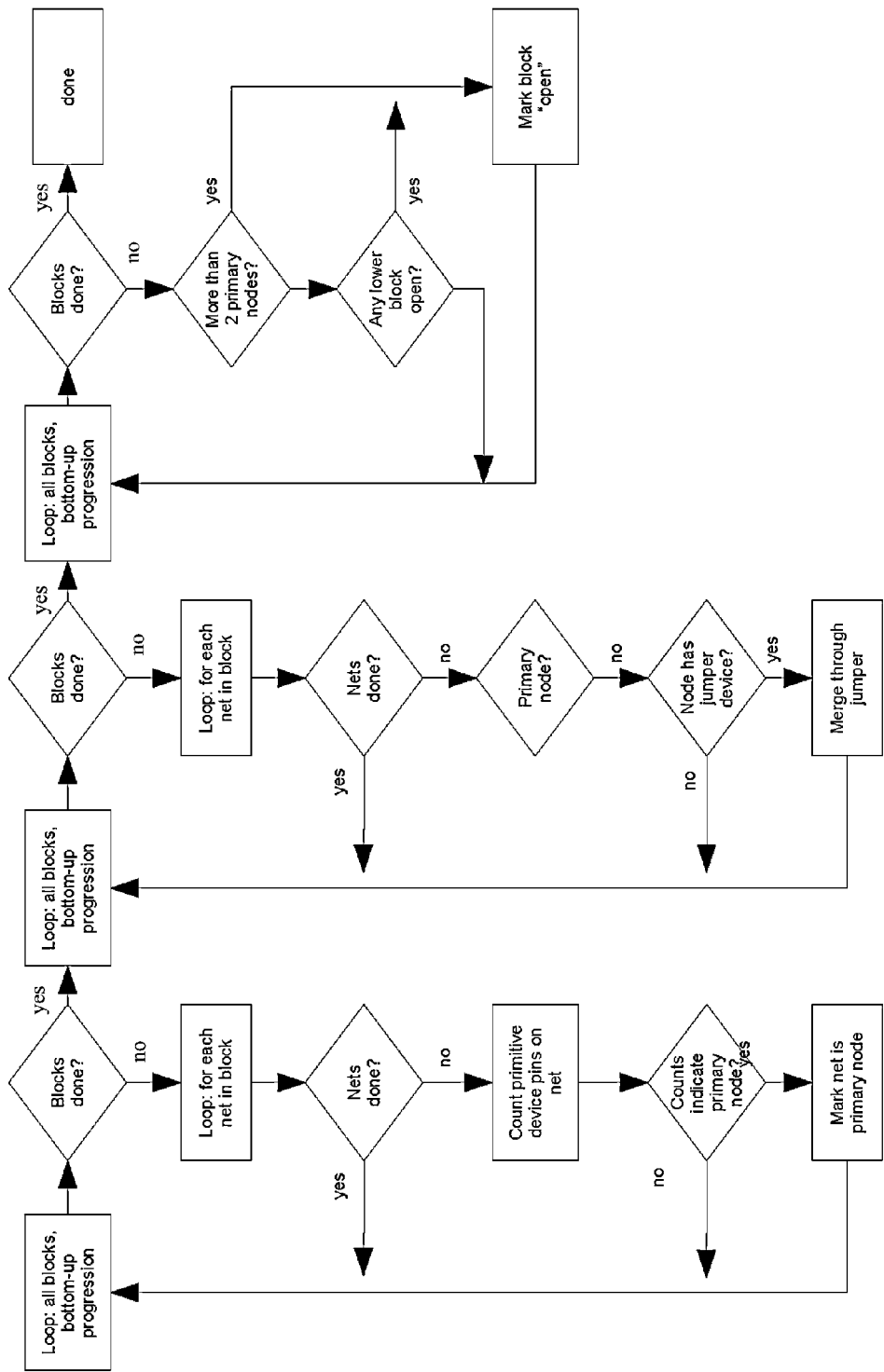
FIG. 7 shows a flow chart illustrating some of the invention's various software implemented analytical methods.

An example of this software implemented data structure in computer memory is shown in FIG. 1. A flow chart example of a software algorithm or method that can make use of the data structure in FIG. 1, as well as the methods discussed in FIGS. 2-6, is shown in FIG. 7.

This data structure will generally comprise a name (net ID 101) identifying the particular net and the block where the net is located. The data structure may also store a flag (102) letting the system know if this net is a primary node (i.e. there is a high connection count at this block or below this block). The data structure will also store a list of connections or jumps to other data structures that represent other nets to form a merged chain leading outward, and a list of switch or regulator devices that also lead outward.

More specifically, in the data structure shown in FIG. 1, (101) is the key to represent and access a particular net in a particular circuit block as a unique identifier (block name+net name) field in the data structure. Field (102) indicates if the net has been determined by the analysis software as being a primary node (see FIG. 2). Here field (103) indicates if the net has been determined to be the top or head part of a merged network (see FIG. 3), and field (104) stores the count of all primitive device connections (pins) on the net, from this block down into all children blocks where net further connects. In this example, the device pin types are broken down into PFET source/drain/bulk, NFET source/drain/bulk, P or N FET gate, etc.).

Here, as discussed in Ser. No. 13/401,704, this information (e.g. high count of P or N FET source/drain/bulk) helps the software to determine if this net is a primary node, as well as to determine other net power aspects as well. This is shown in more detail in FIG. 2.

In FIG. 1, field (105) reports if the net is part of merged network. More specifically, field (105) is the pointer to the incoming link in such chain. Here the "instance" in (105) is the instance (device location) of the jumper/fuse/resistor/etc that joins the two nets, where (105) "net ID" gives the identity of the other net as an incoming link. Thus the data structure records where this net and block is in the overall circuit context by reporting the various neighbor blocks and nets that this particular net and block is linked to.

If the net is part of a merged network, field (106) will provide a list of pointers out to the lower or subordinate links that follow this particular net. As before, "instance" in (106) is the instance (device location) of the jumper/fuse/resistor/ etc that joins the two nets, and the field (106) "net ID" gives the identity of the other net as an incoming link.

In the FIG. 1 data structure, if this net is fed into by a regulator or switch (rather than through 105), then (107) shows the instance of this regulator or switch, and the net ID shows the net ID of the master net on other side that feeds into this regulator or switch. In some embodiments, the software may further examine the properties of the various switches and regulators, and generate errors if these properties are not consistent with the needs of the other net devices.

2: The next part of the process is to identify those nets that directly sink or source power to large portions of circuit (note that the method is not interested in short jumper nets). All of these should ultimately be accounted for in the subsequent steps (that is, the method may fail or function inadequately if it does not to properly track a primary node).

As previously discussed, various methods may be used to identify such nets that directly sink or source power to these circuit portions. Here again, the methods of parent application Ser. No. 13/401,704, incorporated herein by reference, are particularly useful.

Figure 2:
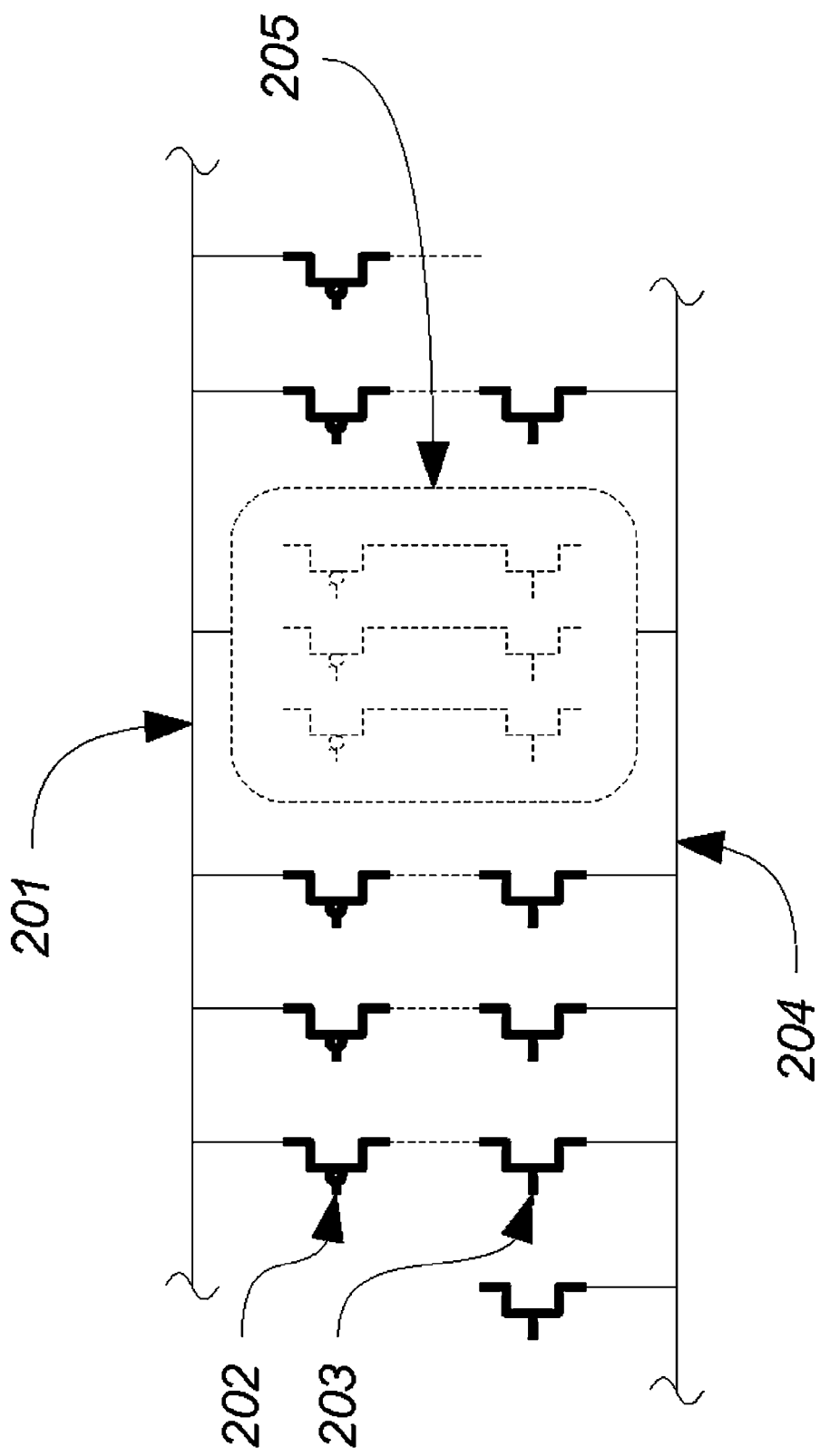
FIG. 2 shows an example of a net that is powering a large portion (e.g. primary node) of a circuit, and thus would be considered to be a power net.

An example of this power identification process is shown in FIG. 2. In FIG. 2, (201) shows a net that is essentially an ideal representation of a power type rail. This high power net can be automatically detected by the invention's software methods because it connects to large number of high power requiring PFET (202) source, drain, or bulk pins, has a low or zero count of NFET (203) source/drain pins and has almost no NFET bulk devices.

In this specification, this type of power type rail will alternatively be called a "primary" or "primary node" because the software has determined that this net's (here the alternate term "rail may alternatively be used to emphasize the power delivery aspects of this net) net's main purpose is for power delivery. As a biological analogy, essentially this primary power rail is the circuit version of biological artery in that it carries a comparatively large fraction of the power for this region of the circuit. Note that other nets may serve some electrical power as well (i.e. may serve as power "capillaries"), but since these deliver a lesser amount of power, in some embodiments the system and method may employ various cutoff parameters, below which the software can be set to disregard more minor power nets.

Put alternatively, a primary node may be a net that connects to a high number of device power pins, such as FET bulk terminal, source/drain terminals, and so on. As previously discussed in parent application Ser. No. 13/401,704, the contents of which are incorporated herein by reference, this number can be an adjustable parameter. More specifically, often this "high power pin number" can be an adjustable parameter which can be adjusted upward or downward according to the characteristics of the circuit that is being analyzed. As a general rule of thumb, it is often useful to set a value of 200 or more high power pins (high power device pins) as the cutoff value for the software to automatically determine if a given net is a primary node. Alternatively, this value may be set to be a value that is at least 2 standard deviations (e.g. 2 SD) or more beyond the typical number of high power pins in the circuit's nets, or a value that only flags 5% of less of the nets in a given circuit as being primary nodes.

The system software can also be tuned with various other variable analysis coefficients to achieve best results for a given circuit. For example, to be considered a primary power rail, the coefficient determining the baseline minimum count of PFET can be set at a value of roughly 200. This particular value may change depending on other considerations, however. For example, if the power detection algorithm ends up reporting too much detail (too many primary nets) (illustration 6), then this coefficient may be increased to reduce the number of detected primary nets, and hence simplify the map.

In general, as the size of the overall circuit increases, then the baseline minimum value may often be increased (scaled up with circuit size) to avoid spurious cases, and better arrive at the appropriate few primary nets, and avoid flooding the user with too much unwanted detail.

Some nets are ground type rails. Here, generally a ground type rail can be detected because instead of there being large numbers of PFETS (202), and few if any NFETS (203), there will now be large numbers of NFETS (e.g. 203) and few if any PFETS (202). Thus a ground type rail is essentially the opposite of the power type rail, in that the software gives more credit and emphasis to the number of NFET device pins instead of the number of PFET device pins.

Generally the method will use the data structure from FIG. 1, together with the power analysis methods from FIG. 2, to analyze each circuit block. (Note that the term "block" may also be designated as a "subcircuit" in languages such as SPICE. Other synonyms for "block" may also be used, depending upon the particular netlist language and system favored by the designer in this analysis).

Generally the analysis will be done using a bottom-up tree progression, and a flow chart showing this bottom-up type tree progression can be seen in FIG. 7. In this method, usually the lowest level "leaf" blocks will be examined first, and the analysis will then analyze the higher level bocks that are connected to these lowest level "leaf" blocks in an upward recursive manner, generally visiting the various parent blocks in a bottom-up order, but avoiding other blocks during any descent. In other words, the analysis will visit a particular block only during an ascent from a particular leaf block, up towards the top or root block.

At each block that is visited or analyzed, the method's software algorithms or methods will then examine each net, and the devices within each net. Thus, for example, when the particular analyzed net connects to various primitive P or N FET pins on a particular device, the method will increment the data structure counters (104), as appropriate, by device pin type.

In the frequent case where the net is also connecting to other nets in other blocks, such as to the input output (I/O) ports of nested blocks (e.g. children blocks that are lower on the hierarchy), the software method will also create references to these lower blocks and determine exactly which specific nested or lower hierarchy net is connected to that specific I/O port.

Then, using that net's data record (101), and in some embodiments following the methods of Ser. No. 13/401,704, the software find that net's primitive pin counts (104), and import those counts up into this net's counters (104), and further add these pin counts to the totals. Put alternatively, the data structure credits any given net with both its own primitive pin counts (e.g. counts of specific pins on specific devices that the net connects to, where each pin and device has an impact on the overall electrical power properties of that net), as well as the primitive pin counts for the lower net(s) (i.e. nested nets, nets further down on the hierarchy) that that given net connects to. These final pin counts will be applied or stored in field (104) of the data structure. Then, if the software determines that the pin counts meet or exceed the baseline pin counts for a primary node, power net, or ground net (e.g. 200 more PFETS), then the software will set the flag (102) that the net is a primary node, and also set that the net is a power or ground type net.

As a result, by counting the power utilization properties of the various devices in this net, and comparing them to various preset criteria, the software can learn a lot about electrical power and voltages needed to adequately power these devices, and this knowledge can then be factored into the overall "big picture" power analysis.

3: In order to do a ground-up analysis, and mesh the thousands of individual details into a larger analysis of the circuit as a whole, it is important that the software also contain algorithms and methods to enable it to put the individual "trees" together to see the larger "forest". One way that the invention's methods can achieve this "big picture" type analysis is by employing software methods that can recognize when individual power rails (e.g. power and ground nets) previously identified in the last step should in fact be appropriately be joined together and considered to be part of a larger supply or ground rail system.

The software can do this by merging those different individual power or ground rails that are joined by jumpers into a larger merged power or ground rail. To help the circuit designers better understand what is going on in the subsequent output or map, in some embodiments, it is useful to use highest block level name of the merged power or ground rail to then label all of the various parts of the power or ground rail.

Figure 3:
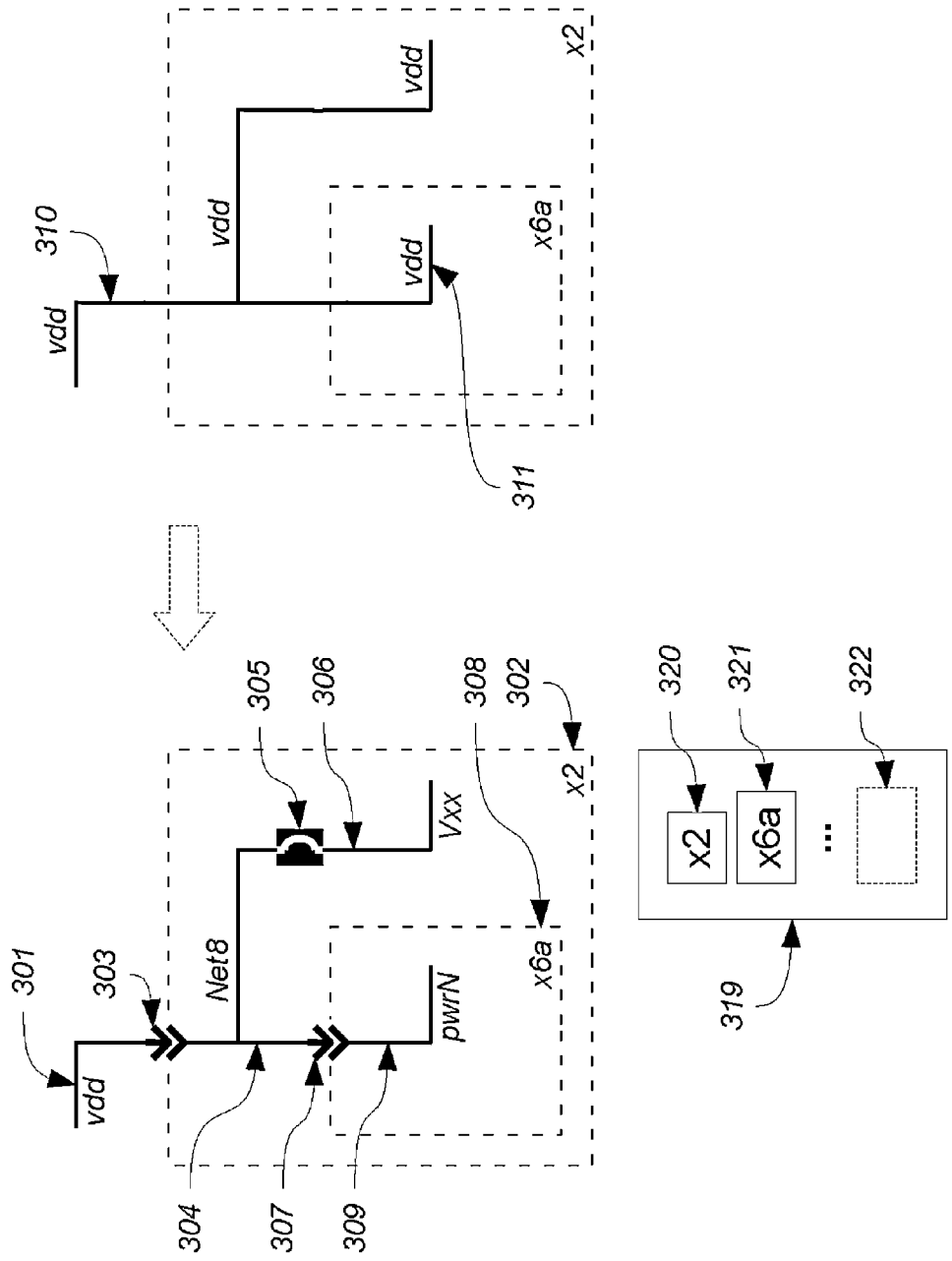
FIG. 3 shows an example of how the invention's methods automatically determine that multiple individual power nets are connecting with each other to form a larger power distribution network.

This process of merging the individual power or ground rails, identified in the previous step, is shown in more detail in FIG. 3.

In the left side of FIG. 3, assume that at the previous step, a number of nets that act as power rails, such as (301), (304), (306), and (309) were identified, but the system has not yet done the analysis to understand that really these individual power rails are simply parts of a larger power rail. Note that these individual power nets were not on the same circuit block, but instead may be present on connected circuit blocks. Note also that the different parts have different names (e.g. vdd, Net8, pwrN, Vxx).

For example, in FIG. 3, an upper-level power net (301) (e.g. a power net from a "parent block" higher up on the nested circuit block hierarchy) connects down to a child circuit block x2 (302) via an IO port (303) and then onto another power net (304). The power net (304), itself on child circuit block x2 302) then connects even further down on the nested hierarchy of bocks into a child block x6a (308) of child block x2 (302) (e.g. a grandchild block). This connection is made via IO port (307) and this further leads into power net (309) on grandchild block x6a (308). Additionally, power net (304) on child block x2 (302) also connects via a zero or near-zero value resistor, or fuse or similar type structure (here these connecting structures are all referred to as jumpers) (305) to power net (306), which is also on child block x2 (302).

Note that although each of these individual power nets (301), (304), (306), and (309) may have their own different netlist assigned names, in actuality a human designer will recognize that this structure in fact forms a single circuit node. A human designer might typically think of these different individual power nets as really being a single larger circuit power node, such as "vdd" (310). Thus in their simplified or reduced form, shown on FIG. 3 on the right, it is better to think of the individual power nets as (301), (304), (306) and (309) as actually being part of a single virtual network (310). Towards this end it is also useful to rename an originally differently named grandchild power net from grandchild circuit block (x6a) to the same name "vdd" given to the larger power net network. In other words, the name "vdd" is taken from the highest block, and this same name is applied to the sections of the power nets that extend into the lower blocks. It is now easier for the human circuit designer to appreciate the common power relationships between these various blocks.

To see how this merging process can be done automatically by the invention's computer software, consider stack-like data structure (319). The purpose of data structure (319) is to store the information needed to determine the current hierarchy path "context" of a power net or other device of interest. Thus context data structure (319) functions somewhat like a software stack. As the invention's software analysis traverses up and down the hierarchy tree of various circuit blocks, new nodes are added to the hierarchy path context when the analysis pushes deeper into the nested circuit blocks, and removed from the hierarchy path context when the analysis pops up to the higher level (parental) circuit blocks. Thus, for example, node (320) is added when the software analysis pushes down further into the nested block hierarchy into child circuit block "x2" (302). When the software analysis pushes still further down the nested block hierarchy into grandchild block x6A (308), then node (321) is added. As a result, when the analysis finally reaches a point where power net (309) is encountered, the context (319) of power net (309) consists of nodes (320), and (321). This helps the software keep track of exactly where in the larger circuit, power net (309) is located.

The context data structure (319) is also used when the analysis software traverses (i.e. shifts the focal point of its analysis) between blocks. This facilitates, for example, the analytical process of upward analysis, traversing from net (309) through IO port (307) to net (304), and from there through IO port (303) to net (301) which represents at least the local "top" block, or higher ordered nested structure, for this particular example.

The software analysis may proceed in several phases. In a first, pre-processing step, the netlist or circuit may be loaded. During this circuit load phase, if a particular circuit block net has an IO port, to facilitate subsequent analysis (or traversal) up and down the nested block hierarchy, the software will assign a lookup to/from a particular block net and its corresponding IO port.

Then, if the software finds that a particular block power net (e.g. 304) connects to any device that can be identified as a jumper or fuse or resistor (e.g. 305), the software will find the corresponding power net on the other side (e.g. 306) of the IO port, and create the to/from associations for the respective net structures and store them in data structure fields (105), (106).

4: Once the initial power analysis and power net merging has been done, in some embodiments, it may be useful to do subsequent analysis on a "bottom-up" basis, generally starting from the circuit blocks and net at the lowest "leaf" stage of the hierarchy, and then proceeding to analyze the higher level blocks that they connect to.

In this type of bottom-up analysis, the analysis software may operate by first opening (i.e. analyzing) any blocks that have more than one primary power node. Starting with blocks that contain more than one primary power nodes is useful, because it often reveals cases where blocks have internal switches or power regulators. It can also identify cases where the primary node may not reach the block's IO port(s), and cases where the parent block splits power using switches or regulators. These interesting cases might otherwise be missed if the analysis proceeded by a top-down approach.

Figure 4:
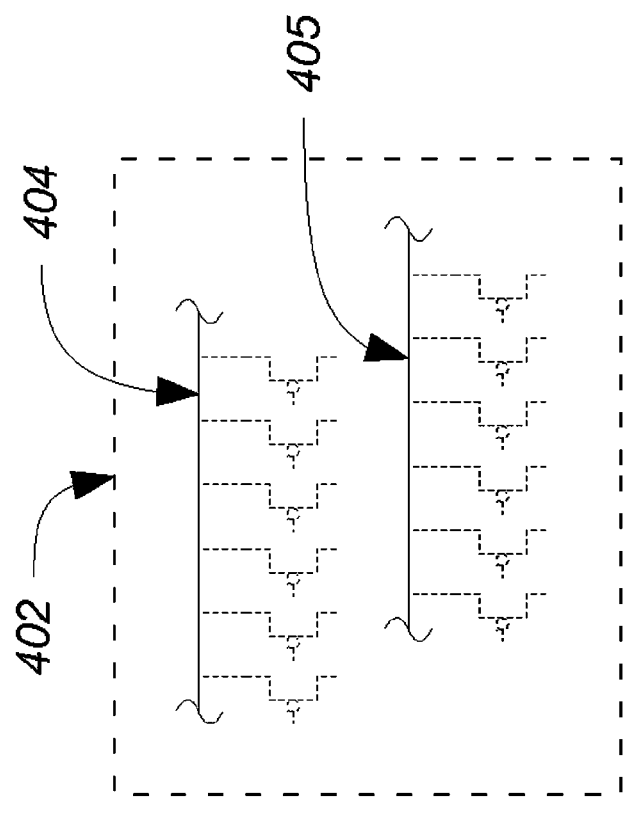
FIG. 4 shows an example of how the invention's software methods may be set to preferentially examine (open) those blocks that have more than one primary power node (i.e. there is a greater chance that these blocks may be served by different types of power supplies). This is because power problems often come from blocks that have mixed power supplies.
Figure 4:
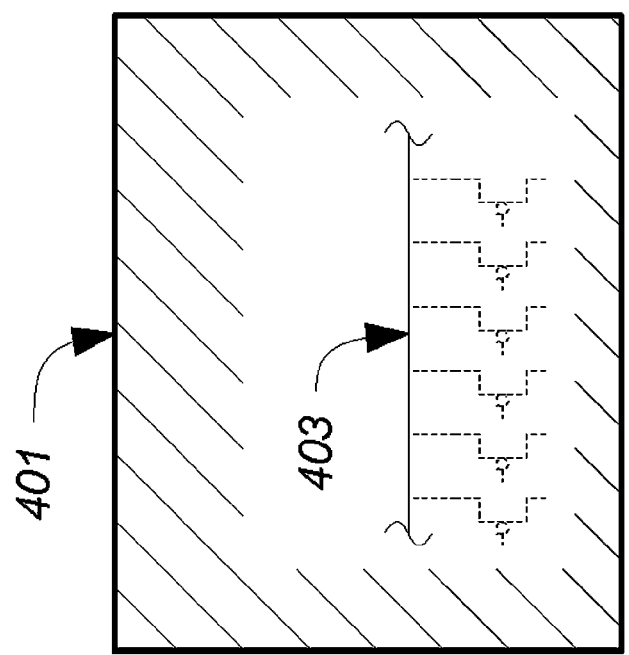

FIG. 4 shows an example of this type of bottom-up type analysis. In FIG. 4, the lower block (403) is a primary power net. However because parent block (401) only contains one child block (403) with one power node, parent block (401) does not need to be analyzed further. Thus it is not necessary to expose the internal detail in parental block (401) in any final power map. It is just not that interesting from a power problem related standpoint.

By contrast, parental bock (402) contains both a first primary power net (404) and a second primary power net (405). When there are two different primary power nets feeding the same block, the chances that there may be an interesting power related problem becomes much greater. Thus block (402) will be marked or flagged to be included in more detail in subsequent analysis, such as the final power map.

5: It is often useful to do further analysis following a bottom-up sequence as well. Here one way to proceed is to have the software further open and analyze any parent block that contains an opened child block. This allows the software to follow a single (or multiple) power/ground net upward as it winds its way through the nested hierarchical block circuit structure (see FIG. 3). Generally, this analysis will iterate on a bottom-up basis until the analysis is complete, and no more actions are possible.

Figure 5:
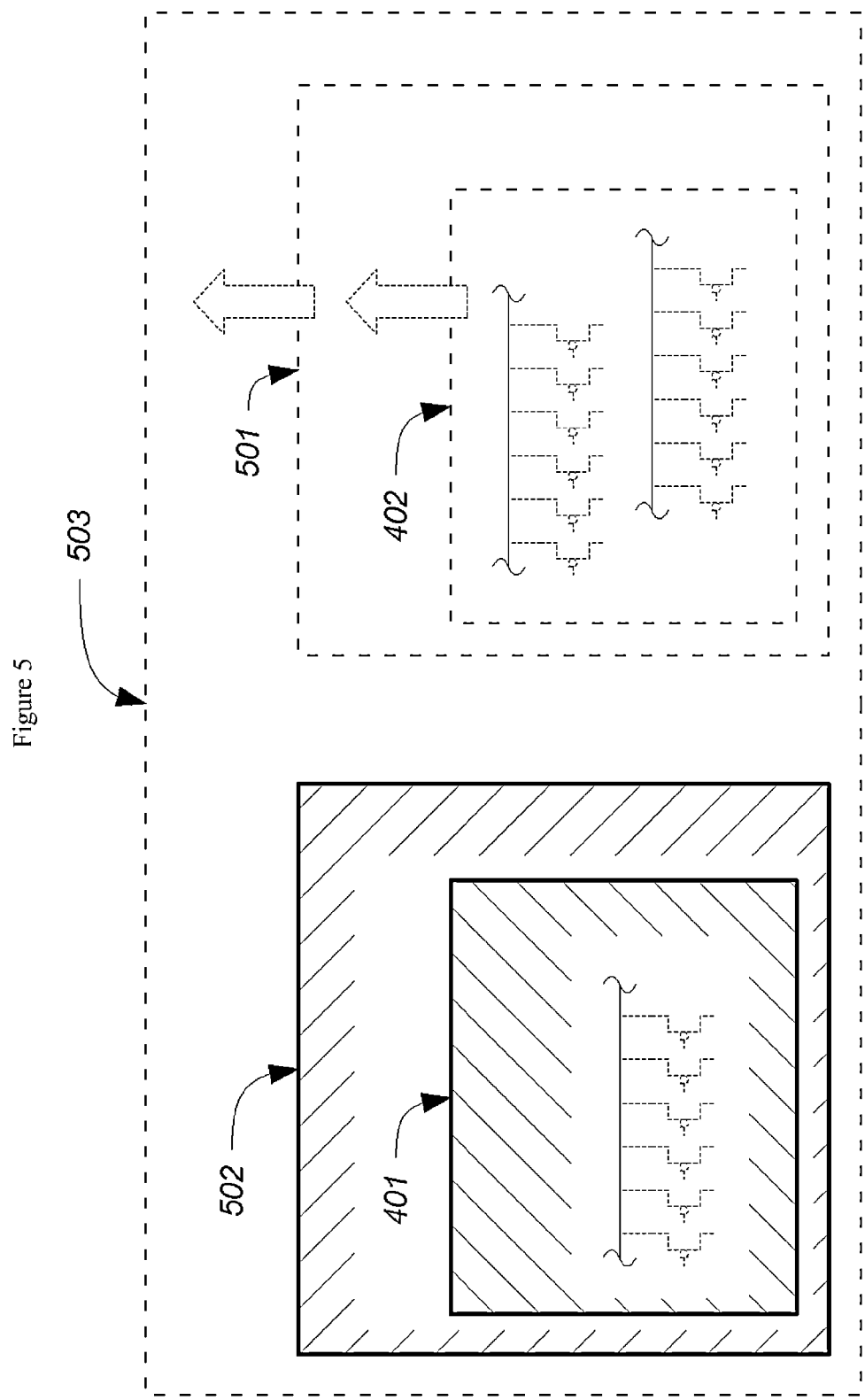
FIG. 5 shows an example of how the invention's software methods can be set to further analyze and expose the inner details of those parent blocks that contain opened child blocks.

FIG. 5 shows an example of this further bottom-up based analysis, here applied after the previous step has been done. For this next part of the analysis, the software will often follow the rule that if a child block is opened, then all of its ancestor blocks above it in the nested hierarchy must also be opened. Thus following this rule, in FIG. 5, block (401) will not be analyzed further, because it was previously found in the previous step not to contain multiple primary power nets within it (it only had one). Therefore, based on this bottom up rule, parental block (502) will also not be analyzed further. Since power related issues mostly occur when mixed power types conflict, and since block (401) and (502) only contain one power type, they are less likely to have power related problems, and thus, at least in this embodiment, need not be analyzed further.

By contrast, block (402) was previously found to have multiple primary power nets, and is thus interesting because there may be power related issues to report here. Thus the software, following the previously discussed rule, will in turn open and analyze block (402), and because block (402) was opened, the software will also open and analyze parental block (501). Because block (501) was opened and analyzed, then still larger grandparent block (503) will be analyzed.

Once the bottom-up nested block opening and analysis is finished, the software now has acquired enough information about the various circuit power issues to be capable of providing high level root cause of failure analysis to the circuit designers. Often it will be useful to convey this high level root cause of failure analysis in a graphical form. An example of such graphical output is shown in FIG. 6.

In this example, assume that the integrated circuit chip that was analyzed, various power related issues determined, and then output in graphical form was comprised of the following high level blocks and power domains.

At the highest (top) level, the original circuit can be viewed as almost a circuit "black box" (601) with two power nets (602) and (603) entering at the top. At this top level, no other information is exposed.

After processing according to the invention's software implemented methods, and going to the next level of detail, original circuit (601) is now represented at the next level of complexity, and this next level (610) is both interesting and useful to the circuit designer.

At the (610) level of detail, integrated circuit (601) has been found to contain a high level but unopened block or cell (611). Block or cell (611) is unopened (i.e. not examined further internally) because the analysis software, according to the previously discussed rules above, determined that it was unlikely that both block (611), and the many nested blocks that were children and grandchildren of (611), were unlikely to have power issues. Because (611) was unopened and does not have any visible child bocks or nested blocks, it is drawn on FIG. 610) as a leaf or lowest level block in the hierarchy. The name of block (611), which the system software can also determine by netlist inspection is shown as label (612).

Similarly the other unopened blocks, such as (632), (631), and (630) are also drawn as lowest level of "leaf" blocks, even though in actuality they may be complex hierarchical structures of various blocks and sub-blocks.

Using the previously discussed automated power analysis and power net merging operations, the software has also found a power net (613) that connects in common to blocks (611) and (632), and the software has rendered the corresponding FIG. 6 graphic as such. The software also found a different power net (615) that connected blocks (630), (632), and switch device (616), as well as a power net continuing on the other side of switch device (616) and connecting it with block (631). Here again, the software can extract various labels (such as 614) from the netlist and affix them to the appropriate power nets and blocks as described previously.

As an example of a common circuit power issue that the invention can detect and report on, consider the problem of power domains that, in the design, were may accidentally provided with inadequate amounts of power because they were served by an inadequate power switch.

As a general design rule of thumb, which may be implemented in the invention's software, generally N transistors, each with width "W", for a total effective width of N*W would (if they were all on exactly the same clock cycle schedule) for adequate operation have to be powered by a switch (or a bank of switches) that had a roughly equivalent width of N*W.

Because typically transistors in a power domain are not all clocked identically, due to clock cycle effects (only some transistors will need power during any given clock cycle), the total switch width can be considerably less than N*W, such as 10% of N*W, however even with clock cycle effects, generally the total switch width should be at least greater than 2% of N*W.

Thus, for example, a power domain with 1000 transistors, each having a width of 1 micron, would (neglecting clock cycle effects), for adequate power require a switch or a bank of switches with a total switch width of 1000 microns. Although clock cycle effects can reduce this to perhaps a switch width of 100 microns, this still is a relatively large switch size, and it is easy to make a design mistake here.

A common circuit design error is to use only one switch, where typically a bank of switches should be used. Here the invention's software, after determining how the various blocks and power nets interconnect, can query the netlist circuit specification for the relative widths and numbers of the various transistors and switches, and calculate if the total widths of the switches or banks of switches are adequate or not (e.g. look for a total bank switch width of between 2% to 10% of N*W). This adequacy determination can then be reported to the user via the graphical output in FIG. 6, or other method.

In addition to showing power nets between blocks, the software may also be set to show other types of types of signal carrying interconnections as well. Showing such non-power signal connections can be useful, particularly if the connections extend between different power domains, because if these signal carrying interfaces do not have adequate protection, (for example with level shifters, or with a digital repeater, or if there is a missing isolation cell), more subtle types of power related problems can occur.

In this example, the software has determined that a plurality non-power signal interface nets or paths (621) extend between leaf blocks (611) & (630). Here the software can be set to not show such paths if it determines that the number paths is small (i.e. below a preset coefficient), and/or if it determines that the paths between two different power domains are adequately protected (by some other preset criteria). If the software determines that a minimal number of signal carrying paths travel between different power domains with different power characteristics, and such paths are not adequately detected, then they may be displayed on the overview graph, as they are in FIG. 6. The software may be set so that even a single signal carrying path between different power domains may be displayed if there is a corresponding error to show along with it.

Thus in one embodiment, the invention may be a software implemented method or software product for determining, from the netlist specification of the circuit of an integrated circuit chip comprising a nested block hierarchy of various devices, the overall adequacy of the circuit's electrical power distribution and power protection schemes. This method or software product may generally comprise using at least one processor and software to determine which nets are power supply nets; determining the connectivity of said power supply nets to different types of power supplies. The method or software product will also automatically traverse the nested block structure of the circuit, ascending and descending in the nested block hierarchy, and automatically determining if each examined block has adequate power coverage, and if any of the interfaces to other blocks are problematic due to differing power supplies between blocks, and report on at least those power supply nets and interfaces where problems are detected.

Alternatively, the invention may be a software implemented method or software product for determining, from the netlist specification of an integrated circuit chip, the overall adequacy of the circuit's electrical power distribution and power protection schemes. Here the circuit will typically comprise a plurality of power domains, each power domain being supplied by the same type of power supply, at least some of the power domains will generally comprise a plurality or hierarchy of nested circuit blocks, each lowest level nested power block comprising at least one primary power node, each primary power node comprises at least one device, and at least some primary power nodes are supplied by a common power net. Here, at least some of the power domains may connected by at least one signal interface. According to this software product or method, after obtaining the netlist in computer readable form, the software and method will use a computer processor, software, and memory to create a plurality of data structures to represent the power status and net connective properties of these primary nodes and nested circuit blocks. Here the plurality of data structures are configured to allow the data structures to be assigned defined positions in a connected tree-like leaf, branch and root hierarchy.

The software and method will then determine which of these nets are power supply nets, and determine the connectivity of these power supply nets to different types of power supplies. Further, for at least those nested circuit blocks with multiple different power supply nets, the software and method may iteratively perform the steps of:

A) descending to the lowest nested circuit blocks in the hierarchy of nested circuit blocks, and determining the lowest nested circuit block's respective primary nodes, along with the primary node's respective power supply nets and netlist connectivity to other primary nodes.

B) for those primary nodes within the lowest nested circuit blocks that are connected to the same power supply nets, assigning their associated data structures to locally adjacent positions of the hierarchy.

C) ascending to the next highest nested circuit blocks in the hierarchy of nested circuit blocks, and for those next highest circuit blocks that also have connected same power supply nets, further assigning, to the data structures of the next highest power blocks, positions at a higher level of the hierarchy that are locally adjacent to each other, and which are also connected to the positions of the corresponding lower level primary node data structures.

D) ascending the various nested circuit blocks until the highest nested circuit block has been determined. Here, in this hierarchy, the highest level nested power blocks that share the same connected power supply nets may be determined to be power domains. The method and software may also determine the signal interfaces between the power domains. The method and software will then usually output or store in memory at least some data on the properties of the power domains, the power supply nets between the power domains, or the signal interfaces between said power domains.

The invention claimed is:

1. A software implemented method of determining, from a specification of a netlist of a circuit of an integrated circuit chip comprising a nested block hierarchy structure of various devices, an overall adequacy an electrical power distribution and power protection schemes of the circuit, said method comprising:
   using at least one processor and software to determine which nets are power supply nets;
   determining a connectivity of said power supply nets to different types of power supplies;
   automatically traversing the nested block hierarchy structure of the circuit, ascending and descending in the nested block hierarchy structure, and automatically determining if each examined block has an adequate power coverage, and if any interfaces to other blocks are problematic due to differing power supplies between blocks; and
   reporting or storing in memory at least in some cases where said blocks have an inadequate power coverage or if any interfaces to other blocks are problematic due to differing power supplies between blocks.

2. The method of claim 1, wherein said automatically determining if each examined block has an adequate power coverage is based on an automated inspection and a mathematical analysis of power needs of individual devices in said examined block.

3. The method of claim 1, further reporting results of said determining in a manner that hides details in power domains and hierarchies of nested blocks where no power issues have been detected, and exposes more details when power problems are detected.

4. The method of claim 3, further reporting the results in a graphical form, showing power and signal interface connections between major power domains and blocks, and graphically noting or highlighting power related problems with the power and signal interface connections.

5. The method of claim 1, wherein said circuit comprises a plurality of power domains, each power domain is supplied by at least one power supply, at least some of said power domains comprise a plurality or a hierarchy of nested circuit blocks, each lowest level nested power block comprising at least one primary power node, each primary power node comprises at least one device, and at least some primary power nodes are supplied by a common power net; and
   wherein at least some of said power domains are connected by at least one signal interface.

6. The method of claim 1, further representing said netlist in a computer readable form for;
   using a computer processor, software, and memory to create a plurality of data structures to represent power status and net connective properties of primary nodes and nested circuit blocks, wherein said plurality of data structures are configured to allow said data structures to be assigned to defined positions in a connected tree-like leaf, branch and root hierarchy; and
   determining which of said nets are power supply nets, and determining the connectivity of said power supply nets to different types of power supplies.

7. The method of claim 1, wherein said automatic traversing further comprises:
   for at least those nested circuit blocks with multiple different power supply nets, iteratively performing steps of:
   a) descending to lowest nested circuit blocks in said nested circuit blocks hierarchy, and determining the lowest nested circuit block's respective primary nodes, along with the primary node's respective power supply nets and netlist connectivity to other primary nodes;
   b) for those primary nodes within a hierarchy of said lowest nested circuit blocks that are connected to the same power supply nets, assigning their associated data structures to locally adjacent positions of said hierarchy;
   c) ascending to next highest nested circuit blocks in said nested circuit blocks hierarchy, and for those next highest circuit blocks that also have connected same power supply nets, further assigning data structures of said next highest power block to positions at a higher level of said hierarchy that are locally adjacent to each other, and which are also connected to the positions of the corresponding lower level primary node data structures; and
   d) ascending various nested circuit blocks hierarchy until the highest nested circuit block has been determined;
   wherein, in said hierarchy, the highest level nested power blocks that share the same connected power supply nets are determined to be power domains;
   determining signal interfaces between said power domains; and
   outputting at least some data on the properties of said power domains, said power supply nets between said power domains, and said signal interfaces between said power domains.

8. A method of determining, from a specification of a netlist of a circuit of an integrated circuit chip, an overall adequacy of an electrical power distribution and power protection schemes of said circuit;
   wherein said circuit comprises a plurality of power domains, each power domain is supplied by a same type of power supply, at least some of said power domains comprise a plurality or hierarchy of nested circuit blocks, each lowest level nested power block comprising at least one primary power node, each primary power node comprises at least one device, and at least some primary power nodes are supplied by a common power net, and
   wherein at least some of said power domains are connected by at least one signal interface;
   said method comprising:
   obtaining said netlist in a computer readable form;
   using a computer processor, software, and memory to create a plurality of data structures to represent power status and net connective properties of said primary power nodes and nested circuit blocks, wherein said plurality of data structures are configured to allow said data structures to be assigned to defined positions in a connected tree-like leaf, branch and root hierarchy;

determining which nets are power supply nets, and determining a connectivity of said power supply nets to different types of power supplies;

for at least those nested circuit blocks with multiple different power supply nets, iteratively performing steps of:
a) descending to lowest nested circuit blocks in said plurality or hierarchy of nested circuit blocks, and determining the lowest nested circuit block's respective primary nodes, along with the primary node's respective power supply nets and netlist connectivity to other primary nodes;
b) for those primary nodes within a hierarchy of said lowest nested circuit blocks that are connected to the same power supply nets, assigning their associated data structures to locally adjacent positions of said hierarchy;
c) ascending to next highest nested circuit blocks in said hierarchy of nested circuit blocks, and for those next highest circuit blocks that also have connected same power supply nets, further assigning, data structures of said next highest power block to positions at a higher level of said hierarchy that are locally adjacent to each other, and which are also connected to the positions of the corresponding lower level primary node data structures; and
d) ascending various nested circuit blocks hierarchy until the highest nested circuit block has been determined;
wherein, in said hierarchy, the highest level nested power blocks that share the same connected power supply nets are determined to be power domains;
determining signal interfaces between said power domains; and
outputting or storing in memory at least some data on the properties of said power domains, said power supply nets between said power domains, and said signal interfaces between said power domains.

9. The method of claim 8, wherein said output data is in a form of a two dimensional or three dimensional topological map that shows at least said power domains, said power supply nets between said power domains, and said signal interfaces between said power domains.

10. The method of claim 9, wherein an amount of said output data in said two dimensional or three dimensional topological map may be adjusted to hide detail inside power domains or blocks that are not relevant to power distribution or power distribution related problems.

11. The method of claim 8, wherein different types of power supplies comprise power supplies with any combination of different voltage levels, different noise levels, or different current levels.

12. The method of claim 11, wherein said method further tests to determine if said signal interfaces are adequately protected to compensate for power supply differences between said power domains, and further parameters that distinguish between those signal interfaces that are adequately protected, and those that are not adequately protected.

13. The method of claim 12, wherein said adequate protection comprises isolation cells, level shifters, digital repeaters, or switches capable of handling the current needs for said power domains or power blocks.

14. The method of claim 8, further testing to determine if any of said power domains or nested power blocks within said power domains are provided with inadequate amounts of power by determining a total electrical current used by said devices within said power domains or nested power domains, and further determining the current carrying capacity of any power nets, power jumpers or resistors, or power switches that supply electrical power to said power domains or nested power blocks.

15. The method of claim 8, wherein said determining which nets are power supply nets is done by determining how many pins connected to said nets are power type source or drain pins connected to high power devices.

16. The method of claim 15, wherein said high power devices are PFET or NFET devices.

17. A computer software product for determining, from a specification of a netlist specification of a circuit of an integrated circuit chip comprising a nested block hierarchy structure of various devices, an overall adequacy of an electrical power distribution and power protection schemes of the circuit, said computer software product comprising:
computer readable software capable of directing at least one processor and software to determine which nets are power supply nets; determining a connectivity of said power supply nets to different types of power supplies;
said software additionally configured to automatically traverse the nested block hierarchy structure of the circuit, ascending and descending in the nested block hierarchy structure, and automatically determining if each examined block has an adequate power coverage, and if any interfaces to other blocks are problematic due to differing power supplies between blocks; and
said software additionally configured to output or store in memory a report on at least the interfaces that are problematic.

18. The computer software product of claim 17, wherein said computer software automatically determines if each examined block has an adequate power coverage based on an automated inspection and a mathematical analysis of power needs of individual devices in said examined block.

19. The computer software product of claim 17, further reporting results of said determining in a manner that hides details in power domains and hierarchies of nested blocks where no power issues have been detected, and exposes more details when power problems are detected.

20. The computer software product claim 19, further reporting the results in a graphical form, showing at least some of power and signal interface connections between major power domains and blocks, and graphically noting or highlighting power related problems with the power and signal interface connections.

21. The computer software product of claim 17, wherein said circuit comprises a plurality of power domains, each power domain is supplied by at least one power supply, at least some of said power domains comprise a plurality or a hierarchy of nested circuit blocks, each lowest level nested power block comprising at least one primary power node, each primary power node comprises at least one device, and at least some primary power nodes are supplied by a common power net; and
wherein at least some of said power domains are connected by at least one signal interface.

* * * * *